Nov. 22, 1960					E. J. SCHNAITTER ET AL					2,960,721
PELLETIZING APPARATUS
Filed Nov. 17, 1959					3 Sheets-Sheet 1

INVENTORS
Edgar J. Schnaitter
Lester R. MacLeod,
BY Pierce, Scheffler & Parker
their ATTORNEYS

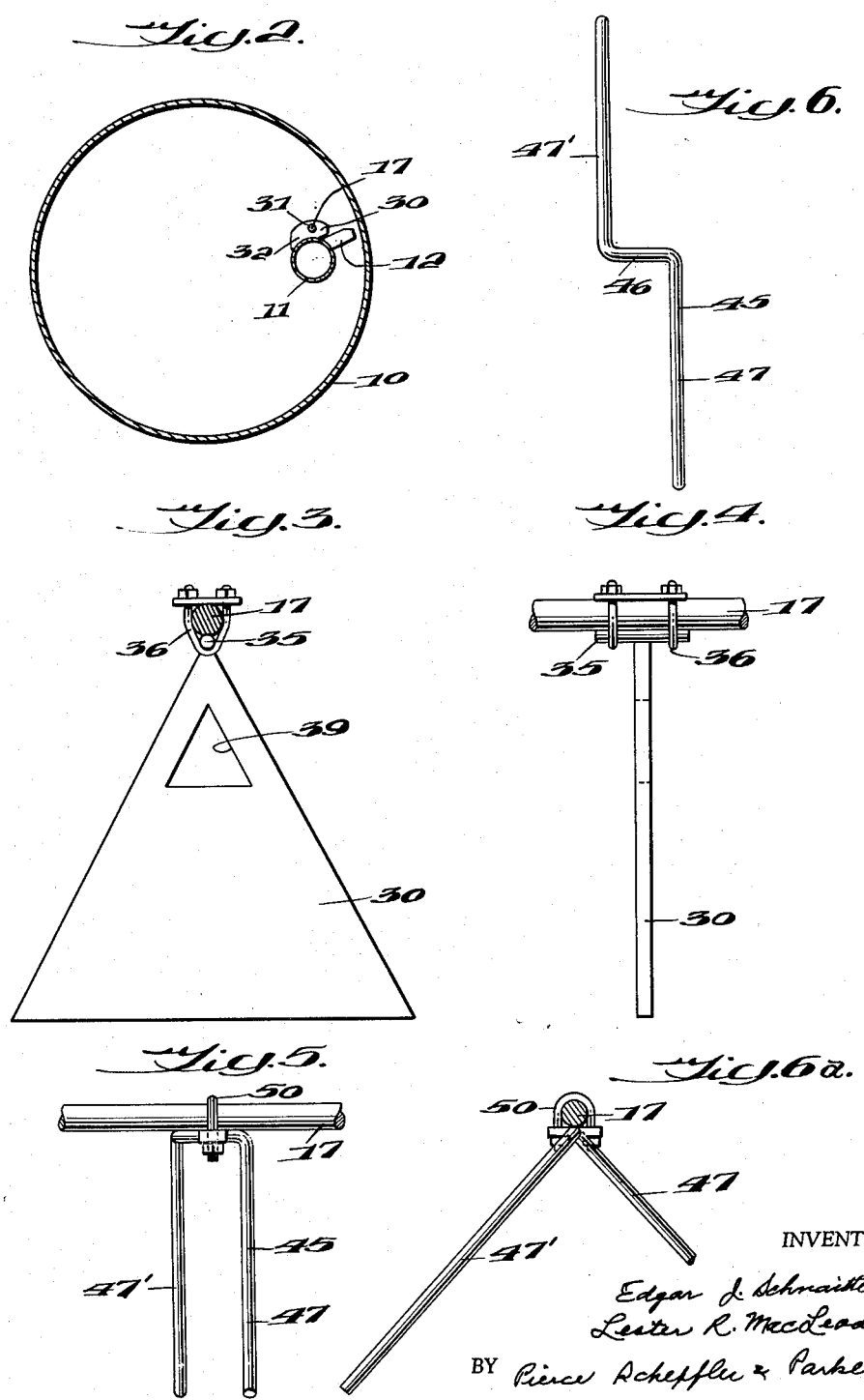

Nov. 22, 1960 — E. J. SCHNAITTER ET AL — 2,960,721
PELLETIZING APPARATUS
Filed Nov. 17, 1959 — 3 Sheets-Sheet 3

INVENTORS
Edgar J. Schnaitter &
Lester R. MacLeod.
BY Pierce, Scheffler & Parker
their ATTORNEYS

United States Patent Office 2,960,721
Patented Nov. 22, 1960

2,960,721

PELLETIZING APPARATUS

Edgar J. Schnaitter, Hoyt Lakes, Minn., and Lester R. MacLeod, Chino Valley, Ariz., assignors to Erie Mining Company, a corporation of Minnesota Filed Nov. 17, 1959, Ser. No. 853,598

7 Claims. (Cl. 18—1)

This invention relates to inclined rotatable balling drums, and is concerned with an improvement to that form of balling apparatus which includes a doctoring means comprising a reciprocatable relatively rigid shaft or cutter bar non-rotative with respect to the balling drum per se and provided along its length with spaced relatively narrow teeth or chisel-like cutting elements adapted, upon rotation of the balling drum and reciprocation of the cutter bar, to limit the thickness of a retained compacted layer of moist finely divided solid material adhering to the inner surface of the balling drum along a series of spaced relatively narrow non-registering allochiral spiral cuts in the surface of said layer, U.S. Patent No. 2,831,210, to Fred D. De Vaney, is illustrative of such balling apparatus, and the present invention will, in the following, be described and illustrated with specific reference to the disclosure in said patent.

In balling apparatus of the type aforesaid the cutter bar, because of the need for structural strength and for rigidity, is usually made up of a pipe ten or twelve inches in diameter, and is so positioned that its teeth contact the layer of fines as the same is rising and usually at a locus nearer the top of the rise than the bottom, e.g., at about 2 o'clock position (viewed from the discharge end of the drum) when the drum is being rotated counterclockwise or at about 10 o'clock position if the drum rotates clockwise. In either case, loose material scraped off the surface of the compacted layer by the scraping action of the cutter bar teeth largely falls onto and tends to adhere to the upper surface of the cutter bar where— if undisturbed—it rapidly accumulates, to the building-up thereon of a substantial mass of the fines. This mass, which typically may take the form of a pyramidal ridge frequently 12 to 15 inches tall, may build up in a matter of only a few (three or four) minutes. Thereupon, the accumulated mass of fines breaks loose—due to vibration—from the cutter bar and falls as large chunks to the bottom of th drum. Such chunks tend to roll up into large balls (i.e., balls many times the size of the relatively small balls or "pellets" being processed in the balling apparatus and often as large as a grapefruit) of unacceptably loose and poorly consolidated structure, which maverick spheres—if not screened out of the pelletized product exiting from the balling drum and reworked (or discarded)—are subjected to the same induration treatment as the rest of the product but appear, in appreciable percentage, in the final "fired" product as large balls with a considerably lower density and compressive strength than the smaller well-rolled pellets.

An object of the invention is the provision of means for preventing the accumulation of substantial masses of loose fines on the cutter bar of the balling apparatus. Another inventive object is the provision of means for continuously sweeping loose fines from the upper surface of the cutter bar and returning them to the body of loose fines, undergoing pelletization in the drum, before any substantial mass of the fines will have had opportunity to accumulate on the cutter bar.

It has been found that the above, and other desirable, objects can be attained by the provision of the novel scraping or cleaning means about to be described.

According to the present invention, a plurality of spaced scraper members are supported above, and substantially touching the upper surface of, the cutter bar which scraper members are adapted—upon reciprocation of the cutter bar—to sweep over the upper surface of the cutter bar and to dislodge therefrom any loose fines adhering thereto so that the dislodged loose fines fall to the "floor" of the drum and are reunited with the loose fines undergoing pelletization. Preferably, the scraper members are attached at their upper ends to a stationary or relatively stationary elongated mounting member which extends through the balling drum, above and generally parallel to, the cutter bar of the balling apparatus, and which is secured at its ends to stationary rigid supports outside of the balling drum, the mode of attachment of said scraper members to said mounting member preferably being such that the scraper members are free to oscillate (as a pendulum) about their points of attachment.

While the elongated mounting member, from which the several scraper members depend, may be a metal rod or the like extending through the balling drum and independent of the latter, it preferably is a metal cable held taut between two supports outside, and adjacent to the opposite ends, of said balling drum, the cable being positioned above and parallel to the cutter bar of the balling apparatus. The use of a cable minimizes the drag of the scraper members and provides a desirable flexibility to the cleaning means.

The scraper members may have any one of several operable forms. Thus, the scraper member may be made of bar stock (e.g., of one-half inch round bar stock) bent into a generally V shape with depending "fingers" at right angles to and at either end of a relatively short central portion, the "fingers" when viewed along the axis of said central portion extending outwardly and downwardly from the latter at a convenient angle, e.g., at an angle of about 45°, from the vertical. This type of scraper member can be attached to the supporting cable by means of a conventional rope clip. Or, the scraper member may be a generally triangular piece of relatively heavy gauge (e.g., ¼") sheet metal to one apex of which there has been welded a short length of metal rod the axis of which rod is perpendicular to the plane of the triangle. The rod can be secured to the cable by means of a pair of conventional rope clips (e.g., the known "Crosby clamp").

Preferably, the scraper member consists of an upright sheet metal piece or plate, the bottom edge of which approximately conforms to the top of the cutter bar and upper edges of the cutter teeth, which plate is secured, as by welding, to a sleeve member, e.g., a short length of metal tubing, having an internal diameter large enough to have the supporting cable passed therethrough, and a plurality of these scraper members are "threaded" onto said cable.

Each scraper member is so positioned as to sweep over a separate portion of the cutter bar equal in length to the length of the reciprocatory stroke of the cutter bar. There may be used as many scraper members as there are teeth; or, the scraper members may be fewer in number than the number of teeth. In the latter event, they may be disposed—with respect to the cutter bar— at those localities where the heaviest build-up of accumulated loose fines otherwise would occur.

The invention will now be described in further detail and with reference to the accompanying drawings, in which:

Fig. 2 is an end view of the apparatus illustrated in Fig. 1, showing the disposition of the cleaning means with respect to the cutter bar;

Fig. 3 is an enlarged front elevational view of an alternative form of scraper member;

Fig. 4 is a side view of the form of scraper member shown in Fig. 3;

Fig. 5 is a side elevational view of another alternative form of scraper member;

Fig. 6 is a top plan view of the member shown in Fig. 5;

Fig. 6a is a front elevational view of the member shown in Fig. 5;

Figure 1:
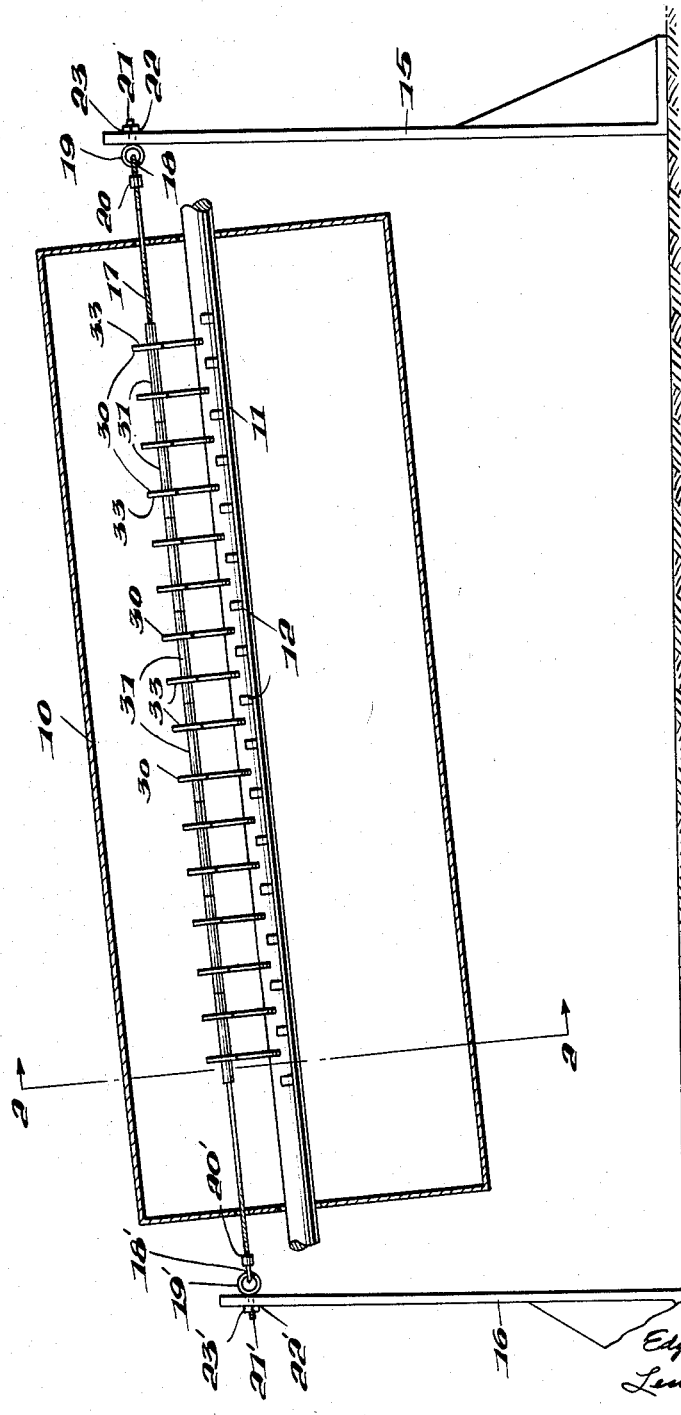
Fig. 1 is a simplified illustration of a balling apparatus of the class described, showing a cutter bar cleaning means in accordance with the principles of the present invention.
Figure 7:
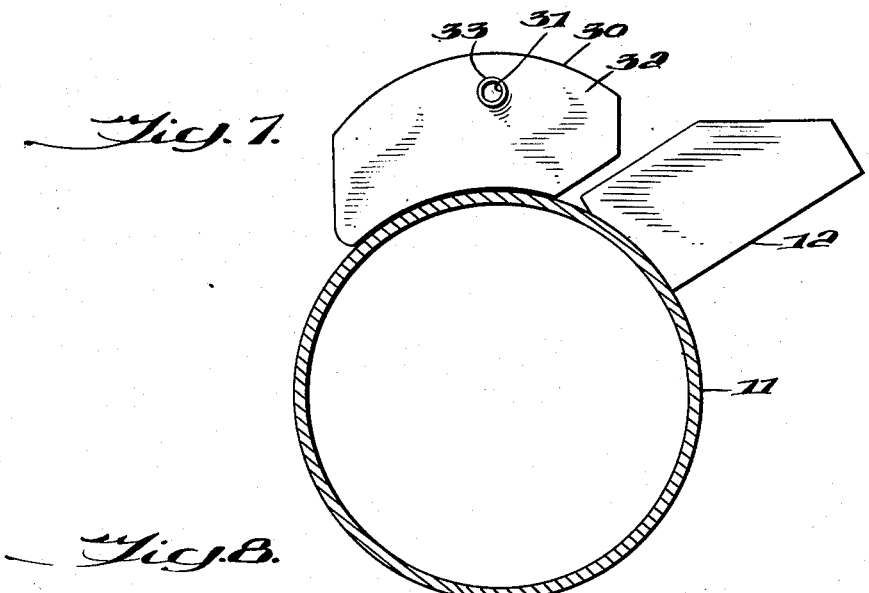
Fig. 7 is an enlarged view of the embodiment shown in Fig. 2.
Figure 8:
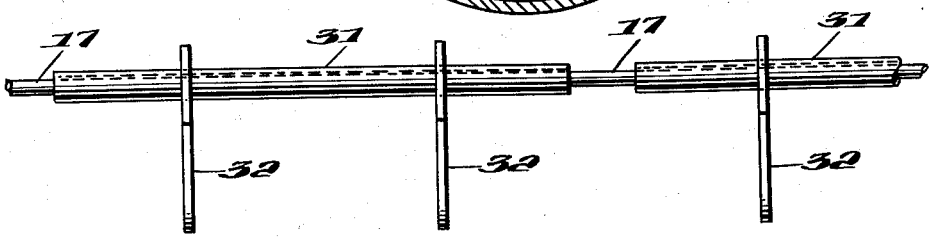
Fig. 8 is a fragmentary view showing in greater detail the structure of the cleaning means shown in Figs. 1, 2 and 7.
Figure 9:
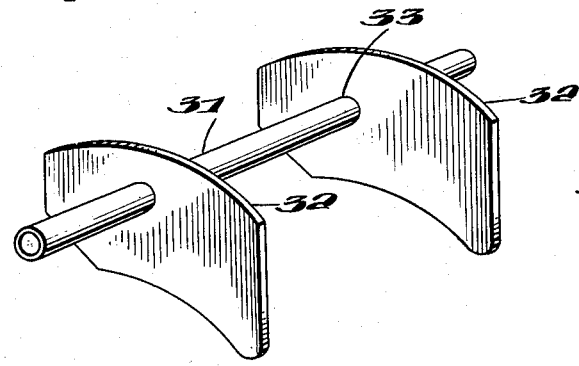
Fig. 9 is a perspective view of the cleaning means shown in Figs. 1, 2, 7 and 8.

In Figure 1 the balling drum and its appurtenances, including a toothed reciprocatable cutter bar, are identical with those illustrated and described in De Vaney Patent No. 2,831,210, and hence are not described in detail. As is known, a balling durm is slightly inclined, from feed end to discharge end, and is mounted on appropriate bearing members for rotation about its axis; it is provided with means for rotating it at a suitable peripheral speed, say 275 ft./min., more or less. The drum also is provided with means for feeding loose fine material thereinto, and, usually is associated with means—adjacent its discharge end—for screening the product discharged thereat. The cutter bar is parallel to the major axis of the drum, and extends through the latter, its exposed ends resting on appropriate movable support means, and at one of its ends is operatively associated with means for reciprocating it a predetermined length of stroke, say, 8 inches, at a predetermined speed, say, four strokes per minute.

The balling drum per se is represented at 10, the reciprocatable cutter bar at 11, and a plurality of relatively narrow and chisel-like cutting elements, 12, 12, secured to said cutter bar in spaced relation therealong.

At the ends of the balling drum 10 and independent from the latter there are fixed two supporting posts 15, 16, which are stationary and rigid and adapted to hold taut a cable 17 stretched between them. At its end adjacent supporting post 15 the cable is looped, as at 18, through an eye bolt 19 and clamped by one or more Crosby clamps, of which only one is shown at 20. The threaded shank 21 of eye bolt 19 passes through an aperture 22 in post 15 and is secured in place by nut 23. Similarly, at its other end the cable 17 is looped, as at 18', through an eye bolt 19' and clamped by a Crosby clamp 20'. The threaded shank 21' of eye bolt 19' passes through an aperture 22' in post 16 and is secured in place by nut 23'. The cable 17 is stretched taut between posts 15 and 16, and—as is illustrated—is disposed above and generally parallel to the cutter bar 11.

According to the preferred embodiment illustrated in Figs. 1 and 2, there are "threaded" onto cable 17 a plurality of scraper units 30, 30 each of which consists essentially of a sleeve member, e.g., a short length of metal tubing (pipe) 31, having an internal diameter such that cable 17 can be passed therethrough, to which sleeve member there are secured two spaced, similarly shaped plates of sheet metal 32, 32, disposed vertically and at right angles to tubing 31. The bottom edge of plate 32 is given a configuration approximating the top of cutter bar 11 and the upper edge of cutter teeth 12, and the plate is so arranged and of such vertical dimension as to contact the top of cutter bar 11. Sheet metal plates 32, 32 are secured to tubing 31 by boring through the upper parts of the plates apertures 33, 33 of a size to accommodate sleeve member 31, inserting the sleeve member in said apertures and spot welding the plates to said sleeve member. As appears in Figs. 1 and 2, the locus of attachment of sheet metal plate 32 to sleeve member 31 is considerably nearer the top than the bottom of the former so that the scraper member may hang in stable manner from cable 17. Sleeve member 31 is free to rotate about or oscillate on cable 17.

Preferably, sleeve member 31 is twice as long as is the distance between two adjacent cutter teeth, and the pair of sheet metal plates are symmetrically spaced on said sleeve so that in an array of said scraper members there are as many sheet metal plates as there are cutter teeth minus or plus one, and the sheet metal plates are spaced from each other the same distance as that between adjacent cutter teeth therebeneath. Thus, where cutter teeth are spaced 8 inches on centers, each sleeve 31 is 16 inches long, and each sheet metal plate in positioned 4 inches from an end of said sleeve.

According to an alternative embodiment, spaced triangular shaped scraper members 34, 34 may be suspended from cable 17, there being as many scraper members as there are cutting elements 12, 12. As shown in Fig. 3, to an apex end of triangular scraper member 34 there is welded a short piece of round bar stock 35, the major axis of piece 35 being perpendicular to the plane of triangle 34. A pair of Crosby clamps 36, 36', on opposite sides of triangle 34, secure piece 35 to the cable 17.

In order to distribute the weight of the scraper member 34 in desired manner, a portion of the triangular member 34 adjacent the welded-on piece 35 may be cut out, as illustrated at 39.

According to the embodiment illustrated in Figs. 5 and 6, the scraper member 45 is formed of round bar stock, the same being bent to provide a short central portion 46 and depending therefrom a pair of off-set legs 47, 47' which extend substantially at right angles with respect to central portion 46 but in opposite directions so as to form between them a substantial angle (e.g., 90°). Scraper member 45 is secured to cable 17 by means of a rope clip 50 which holds the central portion 46 of the member parallel to and rigidly against, the cable 17.

We claim:

1. A balling apparatus for forming loose finely divided solid material into small balls or pellets, including an inclined rotatable balling drum and a reciprocatable cutter bar extending through the drum in parallel relation to the major axis of the drum and being provided along one side thereof with a plurality of spaced parallel relatively narrow cutting elements adapted, upon rotation of the drum, in use, to contact the surface of and to limit the thickness of a compacted layer of the finely divided solid material adhering to the inner surface of the drum, characterized in that a stationary mounting member independent of the drum and of the cutter bar extends through the drum, the same being positioned above and generally parallel to the cutter bar, and in that a plurality of scraper member are associated with and depend from said mounting member, depending portions of said scraper members being in contact with upper surfaces of said cutter bar and adapted, upon reciprocation of said cutter bar, to sweep loose finely divided material from an upper surface of said cutter bar.

2. A balling apparatus as defined in claim 1, in which the mounting member is a wire rope or cable held taut between support members at either end of, and independent of, said balling drum.

3. A balling apparatus as defined in claim 1, in which each scraper member consists essentially of at least one vertically disposed plate secured, at a locus above its center of gravity, to and intermediate the ends of a sleeve member coaxially mounted upon said mounting member, the lower edge of said plate having a configuration approximately complementary to the top of said cutter bar and the upper edges of said cutting elements.

4. The balling apparatus defined in claim 3, in which each scraper member consists essentially of a pair of plates symmetrically spaced on said sleeve member, the distance between the plates being equal to the distance between adjacent cutting elements.

5. A balling apparatus as defined in claim 1, in which each of the scraper members is a triangular piece of sheet metal to a corner of which there has been fixed an attaching bar for securing the same to said mounting member.

6. A balling apparatus as defined in claim 3, in which the scraper members are secured at their attaching bars to said mounting member by means of clamping devices.

7. A balling apparatus as defined in claim 1, in which each of the scraper members is a length of bar stock bent to provide a central portion and two legs depending from the same, one leg and the central portion lying in a common plane and at right angles to each other and the other leg being disposed perpendicular to said common plane.

References Cited in the file of this patent

UNITED STATES PATENTS

| | | |
|---|---|---|
| 2,311,154 | Carney | Feb. 16, 1943 |
| 2,603,832 | Clark et al. | July 22, 1952 |
| 2,726,068 | Howden | Dec. 6, 1955 |
| 2,831,210 | De Vaney | Apr. 22, 1958 |